United States Patent [19]

Couche

[11] 3,723,487

[45] Mar. 27, 1973

[54] PROCESS FOR EXTRACTING OIL FROM PALM FRUITS AND OLIVES

[76] Inventor: Raymond Arthur Couche, Ypres Rd., Kelmscott, Australia

[22] Filed: July 14, 1970

[21] Appl. No.: 3,525

Related U.S. Application Data

[63] Continuation-in-part of Ser. No. 592,631, Nov. 7, 1966, abandoned.

[52] U.S. Cl..............................260/412.4, 260/412.8
[51] Int. Cl..................................................C09f 5/02
[58] Field of Search.........................260/412.4, 412.8

[56] References Cited

UNITED STATES PATENTS

| | | | |
|---|---|---|---|
| 2,680,754 | 6/1954 | Stapelberg.........................| 260/412.4 |
| 3,408,374 | 10/1968 | Cavanagh et al..................| 260/412.4 |

*Primary Examiner*—Lewis Gotts
*Assistant Examiner*—Johnnie R. Brown
*Attorney*—Linton & Linton

[57] ABSTRACT

Multi-stage, counter-current process for extracting oil from palm fruit and olives, in which the fruit is disintegrated in the presence of the extraction solvent and passes through the successive stages meeting the extraction solvent in counter-current in such a manner that in each stage the slurry of solvent and solids is agitated, whereupon the solvent is separated from the solid material before being passed on for further extracting action.

The solvent used is either acetone, or a mixture of ethyl alcohol, ethyl acetate and acetone in the ratio of 1:1:1 by volume, or ethyl alcohol, ethyl acetate and isopropyl ether in the ratio of 4:2:1 by volume.

The temperature is maintained at 50° to 55°C throughout the extraction process, and the water:solvent ratio adjusted to 1:1 to 1:2 by weight in the first stage. The recovery of oil from the solvent occurs principally from the outgoing liquor of the first stage.

5 Claims, 1 Drawing Figure

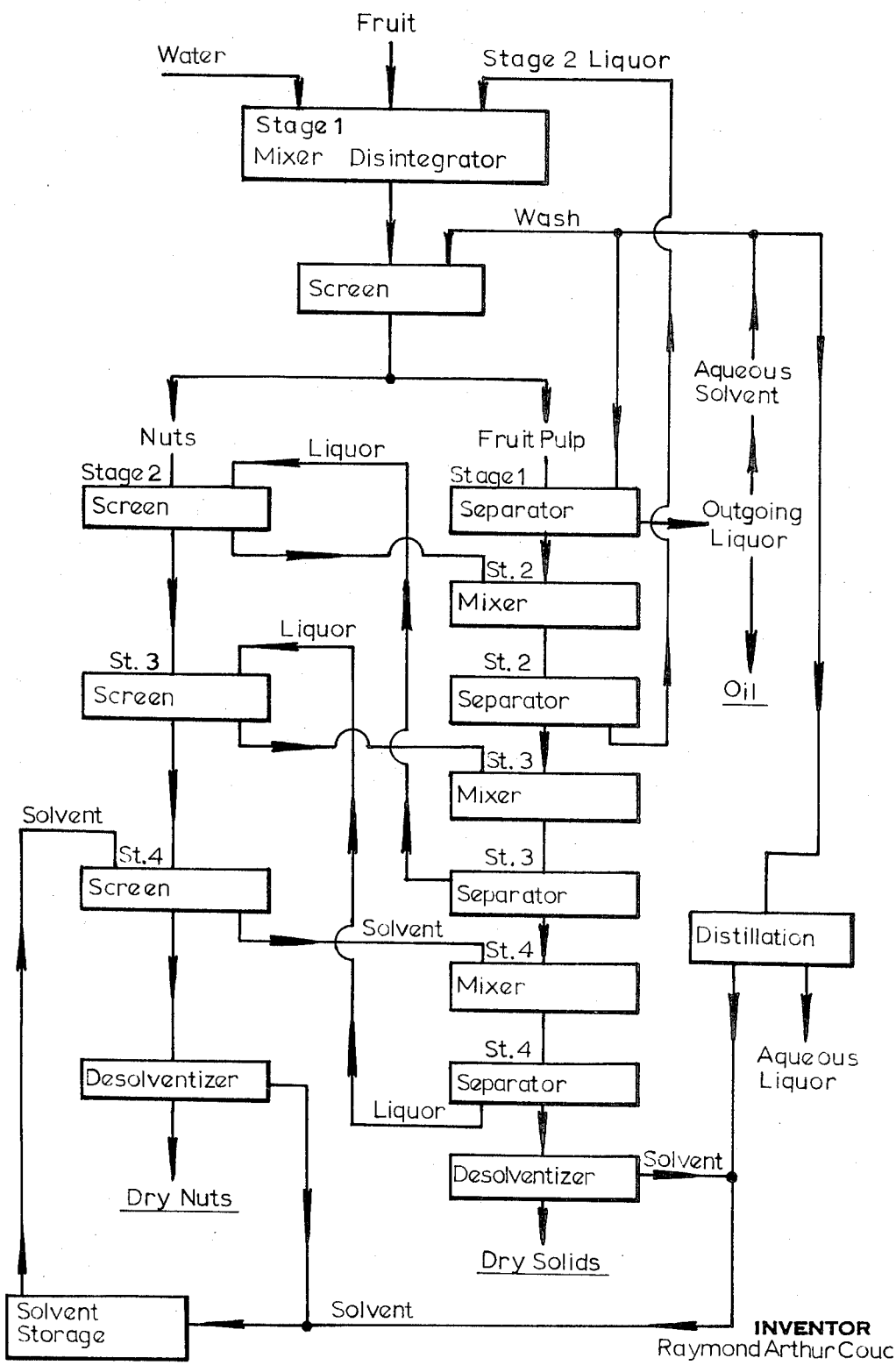

PROCESS FOR EXTRACTING OIL FROM PALM FRUITS AND OLIVES

This is a continuation in part of application Ser. No. 592,631 filed Nov. 7, 1966, now abandoned.

This invention relates to a process for extracting oil from palm fruit and olives. The present practice of oil extraction consists of pulping the fruit and pressing the oil and juice from the solid material with hydraulic or mechanical presses.

In the case of palm fruit the fruit are harvested in large bunches. Early sterilization is necessary to destroy the enzyme activity which otherwise would degrade the oil. After sterilization, which also loosens the fruit in the bunch, the fruit is separated from the stalk by threshing, digested and pressed. The oil is recovered by settling from the press liquor or by centrifugation. The fruit pulp residue from the press is dried and the nuts are recovered as a separate product. The residual fibrous solid is either burnt as fuel or used as a plantation mulch.

In the case of olives the fruit are crushed lightly and oil and juice pressed therefrom, this pressing yielding the prime grade oil. The cake is broken up often mixed with some water and pressed again at a higher pressure to yield a second grade oil. Sometimes yet a third pressing at very high pressure yields a low grade oil. The remaining press cake may be dried and a low grade oil recovered by solvent extraction. The oil, other than that recovered by final solvent extraction, is recovered by settling or centrifugation. The solid material is either burnt or used as a plantation mulch.

The object of the present invention is to provide for direct solvent extraction of the fruit pulp and the substantially complete recovery of oil as prime grade from palm fruit and olives.

Broadly the invention resides in a process for extracting oil from palm fruit or olives which comprises passing the fruit into a multi-stage counter-current flow with an organic solvent which is miscible with water and in which oil is soluble, the fruit pulp being disintegrated in at least the first stage with medium to high intensity mixing, sufficient to cause disintegration of the pericarp (fruit pulp) without significant breaking of the nuts, the temperature being such to maintain the oil being extracted in a liquid condition.

High intensity mixing is only essential for palm fruit. Olives can be processed in accordance with the invention with medium intensity mixing.

The organic solvents which are suitable for the purposes of the present invention comprise acetone or suitable mixtures of solvents such as ethyl alcohol, ethyl acetate and acetone in the volume ratio of 1:1:1, or ethyl alcohol, ethyl acetate and isopropyl ether in the volume ratio of 4:2:1, or other alternative mixtures all of which preferably have a boiling point or boiling range lower than 100°C.

It is generally understood that in the case of palm fruit the enzyme which causes rapid deterioration of the palm oil is destroyed when heated to 50° – 55°C. for about 30 minutes and for the purposes of the present invention it is generally accepted that extraction should be carried out at a temperature of between 50° and 55°C. In the case of olives no such enzymatic deterioration of oil is encountered but a similar operating temperature has advantages in more rapid extraction of oil from the pulp. The extraction should also be carried out at a temperature sufficient to maintain the oil being extracted in a liquid condition.

The palm kernel contained in the palm nut must remain whole and undamaged as it contains a completely different oil from that which is contained in the fruit pulp. If the fruit were to be comminuted and so prepared for solvent extraction in the normal way the nut and kernel would be crushed together and even if the palm fruit oil itself was not affected by enzyme action the admixture of the two oils would degrade both products.

The degree of nut breakage which can be tolerated is less than 1 percent by weight. Nut breakage in excess of this figure may produce a mixed oil which is undesirable.

The mixing is carried out preferably in a cylindrical tank fitted with four vertical baffles spaced evenly around the tank wall and using an open turbine impeller of flat or curved blades placed vertically without pitch and located centrally in the tank. The baffles extend radially inwardly from the wall of the tank and are between one-twelfth and one-tenth the diameter of the tank in width. The baffles extend the full depth of the tank. The turbine blades are preferably located no more than one-half the outside diameter of the blades from the floor of the tank. The mixing impeller is driven at a suitable speed to produce intense agitation in the case of palm fruit and medium agitation in the case of olives to cause disintegration of the pericarp or fruit pulp without breaking the nuts. When the turbine is to be used with a low to medium power input for breaking up olives it may have between four and six blades having a diameter of between one-third and one-half the diameter of the tank. For palm fruit the diameter of the turbine blades is between one-half and three-fourths the diameter of the tank and preferably between one-third and three-fourths the diameter of the tank and preferably has six to eight blades in order to supply sufficient power to disintegrate the tough pericarp. More power is required to disintegrate fresh fruit than sterilized fruit which is softened during sterilizing. Curved blades are to be preferred because of better wear characteristics. Sufficient space should be allowed between the tips of the turbine blades and the baffles to prevent mechanical crushing of the nuts. Generally speaking "high intensity" mixing may be arbitrarily defined as a power requirement of 0.25 to 1.00 HP/cubic foot, "medium intensity" as 0.1 to 0.25 HP/cubic foot and "low intensity" as 0.01 to 0.1 HP/cubic foot. The mixing tanks may be operated full with continuous feed and overflow. The sizes of the tank and mixer will depend upon the raw material input and retention time essential for effective disintegration of the fruit. For fresh palm fruit a period of 15 minutes appears to be satisfactory while for sterilized palm fruit and olives a period of about 5 minutes should be suitable. The slurry passing out of the mixing tank consists of fruit pulp, oil, water, solvent and nuts; this slurry is passed over a screen to separate nuts and coarse fibrous solid, the undersized material passing to a centrifuge or alternative equipment for separation of solid and liquid. In the case of centrifuges these may be either basket type continuous feed units or alternatively solid bowl decanter units. The solid discharge passes to the second stage whereas the outgoing liquor is passed to the oil and solvent recovery section.

The oil is separated, preferably by centrifuge, from the aqueous-solvent liquor and stripped of solvent. The aqueous-solvent is distilled for recovery of the solvent and the aqueous solution discharged from the still utilized on the plantation. In the second and subsequent stages the mixing required is not intense and while the general pattern of the mixer unit is retained, a smaller impeller consuming less power is used. The solvent flows back to the second stage from the third and before entering the mixing tank it is used to spray-wash the nuts and coarse fiber from the first stage screen. After a suitable period of mixing the solid is again separated from the liquid and passed to the third stage while the liquid passes to the first stage. The coarse solid and nuts are rinsed with each solvent liquor before it is passed into the mixing tank with the solids passing forward. The stage 4 liquor washes stage 2 coarse solids and nuts and mixes with stage 2 fine solids to form stage 3 whereas fresh solvent washes stage 3 coarse solid and nuts and mixes with stage 3 fine solids to produce stage 4. The stage 4 solids discharge to a solvent dryer for recovery of solvent. Additional stages may, if necessary be added to obtain the optimum recovery of oil.

The process is illustrated in the flow sheet shown in the accompanying drawing.

The various aspects of the present invention will be better understood by reference to the following description of several specific embodiments thereof as applied to a sample of fresh palm fruit and two samples of sterilized palm fruit.

A. Equipment.
   A.1. Disintegrator-Extractor. This unit was a high intensity mixing vessel which generated high shear forces in the region of the impeller. It was a 7 inch diameter by 10 inch high vessel fitted with four vertical baffles of 0.75 inches width and spaced evenly round the tank wall. The mixing impeller was an open turbine with six flat blades all place vertically and the impeller was placed centrally in the tank 1 inch above the tank bottom. The outside diameter of the turbine was 4.5 inches which allowed a clearance of 0.5 inches between the turbine tip and baffles. The material of construction was mild steel.

The impeller was driven by a 0.5 H.P. flameproof motor with speed control by means of a variable voltage control. The general operating speed was 800 r.p.m.

A.2. Basket Centrifuge. A 12 inch diameter by 4 inch stainless steel basket type bowl was fitted to an MSE Super Medium centrifuge and operated at 2000 r.p.m. The basket had 2mm diameter holes.

A.3. Miscellaneous Equipment. An electro-thermal heating tape was used to maintain temperature in the mixing vessel.

Several extraction stages where mixing was not required were carried out in a large stainless steel beaker and solvent was separated from the solid with a Buchner filter.

B. Procedure.
   B.1. Fresh Fruit. One Kilogram of fruit was extracted with one liter of solvent (acetone) with water added to bring the total water/solvent mass ratio to 1/2, e.g.

1 kg. fruit contained an estimated 200 g. water
      200 g. water were added to the batch, and
      800 g. acetone were added, hence total water/acetone = 400/800 g. i.e. a ratio of 1/2.

This solution was placed in the mixing vessel and the temperature was adjusted to 50°C. With the mixer in operation the fruit was added and the mixing speed adjusted to be just not too violent. Mixing was continued for 15 minutes.

After the reaction period the liquid and solid were separated using the basket centrifuge which was pre-heated with boiling water. The solids recovered were further extracted with one liter of acetone in the mixing vessel in order to complete the shredding of the fruit pulp and produce "clean" nuts. The solids and liquids were separated using a Buchner filter.

The solid residues were extracted twice more with fresh quantities of acetone using the stainless steel beaker method. The final solids were dried in an air oven at 90°C.

The liquors obtained were used in subsequent extractions in countercurrent operation, the first stage liquor in each case being processed for oil recovery. The system was operated for a sufficient time to be nearly in equilibrium, and oil was recovered from stage 2 liquor prior to stage 1 extraction to evaluate the potential of such recovery. A smaller percentage was recovered from stage 3 liquors by cooling the liquor between stage 2 and stage 3. In practice the oil could all be passed forward into stage 1 or separated.

The liquors recovered by centrifugation were washed from the centrifuge using boiling water and the oil recovered from these liquors by settling at 80° – 90°C. for some hours. After cooling the aqueous layer was poured off leaving the solid layer of palm oil and fine solids. Clean water was added and the oil mixture melted and stirred in the clean water. Several hot water washes recovered a clean palm oil which was dried and stripped of residual solvent at 120°C, under 755 mm vacuum.

The oils were analyzed for free fatty acid and compared with values obtained for the oil extracted from the original sample by means of boiling water. The technique adopted for these comparative oils was disintegration of the palm fruit pulp in boiling water, evaporation of the water on a steam bath an extraction of the dry solids with hexane. The hexane was evaporated and stripped under vacuum.

B.2. Sterilized Fruit.
   B2.1. First Sample. The procedure outlined for fresh fruit in B.1. was used with the exception that reaction time in stage one was reduced to 5 minutes and stage 2 was carried out by the beaker technique.

The residual solids were analyzed for oil content and the fine solids which passed 22 mesh screen were analyzed for nitrogen.

In order to obtain the total oil yield for stage 1 the palm oil was settled hot and cooled. The solid palm oil was removed and the remaining sludge and aqueous layer was extracted several times with hexane until the hexane layer appeared to be free of oil. The hexane extracts were combined and the oil recovered by evaporation of the hexane and stripping under vacuum at 120°C.

The "dry Sludge" was recovered and analyzed for residual oil.

The aqueous liquor was evaporated to dryness to determine soluble solids.

B2.2. Second Sample. The procedure adopted with this sample was similar to the previous method but the water/solvent ratio in Stage 1 was adjusted to 1:1.

The re-cycle liquors were retained from the operation outlined in B 2.1. and used directly at the commencement of operation with this sample. The stage 1 liquor was heated to boiling and re-centrifuged through the residual fiber bed already in the centrifuge basket. A light rinse with boiling water was used to displace oil from the fiber. This technique was adopted in an attempt to reduce the percentage of solids-not-oil which seemed to be high in the previous operation.

The stage 2 liquor was diluted with water to produce the ratio required for stage 1 and heated to 50°C. This dilution caused oil to precipitate due to reduced solubility. The oil was separated by gravity.

The stage 3 liquor from the last batch processed was cooled to precipitate oil insoluble at atmospheric temperatures (about 15°C.) With continuous operation without cooling all the oil stayed in solution and passed into stage 2. This oil crystallized from solution and was separated by draining. The residual solvent content was evaporated and the oil was dried and stripped under vacuum.

The Process was also varied as follows:

The nuts were physically separated from the centrifuged solids from stage 1. Before passing the liquor into the residual solids for each stage, the nuts were washed with the re-cycle solvent of the particular stage.

The process also was extended to six stages for more effective recovery of oil from the residual solids. The clean nuts and residual solids were de-solventized separately.

The oils were analyzed for free fatty acid and the oil content of the residual solids was determined by Soxhlet extraction. Nitrogen was also determined on the − 22 mesh solids. The solid content of the aqueous solvent ex stage 1 was not determined for this sample, nor was the oil content of sludge from stage 1.

C. Results.

C.1. Fresh Palm Fruit. After the first trial of fruit in the bunch (cut into small portions and including stalk cut into 2-3 cm lengths) all tests were restricted to fruit because of difficulty in disintegrating the stalk fiber.

The oil recovered contained a high percentage of free fatty acid and because this was unsatisfactory, detailed study was not completed.

The FFA valve of oil samples obtained are shown in Table 1.

TABLE 1

F.F.A. as percent palmitic acid in PALM OIL extracted from fresh palm fruit.

| Sample | % FFA as palmitic acid |
|---|---|
| Fresh fruit, stage 1 oil extracted by solvent extraction as described above immediately after receipt (about 6 days after harvesting) | 43.6 |
| Fresh fruit extracted with boiling water. One day after solvent extraction as described above (fruit stored under refrigeration) | 50.9 |
| Fresh fruit 2 days after receipt sterilized at 60 psig for 30 min. then oil extracted. | 54.1 |

C.2. Sterilized Fruit.

C2.1. First Sample. A mass balance is shown in Table 2, together with head sample analysis Free fatty acid values on recovered oils are shown in Table 3.

TABLE 2

Process Mass Balance and Head Sample Analysis for Sterilized Palm Fruit

| Mass Balance Output (g) | Input 1 Kg. fruit. Oil | Solids | Nuts | Water (by difference) |
|---|---|---|---|---|
| Stage 1 | 136.5 | | | |
| " 1 (Hexane | 54.0 | | | |
| " 2 | 106.0 | | | |
| " 3 | 50.0 | | | |
| " 1 sludge | 100.0 | 20.0 | | |
| + 22 mesh residue | 0.4 | 37.6 | 308.0 | |
| − 22 mesh residue | 1.9 | 28.1 | | |
| Totals | 448.8 | 85.7 | 308.0 | 157.5 |
| | Oil | Solids | Nuts | Water (by difference) |
| Head Samples (Percent) | | | | |
| 1. | 46.8 | 12.4 | 23.0 | 17.8 |
| 2. | 46.5 | 13.5 | 22.0 | 18.0 |

TABLE 3

Free Fatty Acid Content of Oils from Sterilized Palm Fruit

| Sample | % FFA as Palmitic Acid. |
|---|---|
| Head (before solvent extraction) | 2.25 |
| Stage 1 | 2.28 |
| Stage 2 | 2.00 |
| Stage 3 | 0.42 |
| Head (after completion of Solvent extractions) | 2.70 |

The nitrogen content of the fine solids (minus 22 mesh) was 2.17 percent as determined by Kjeldahl analysis. Other possible constituents such as phosphate were not determined.

The oil content of residual solids was:
+ 22 mesh 1.1%
− 22 mesh 6.3%
dry sludge 83.4%

C2.2. Second Sample. A detailed mass balance was not determined with this sample. Yield data and an analysis of a head sample are shown in Table 4. Free fatty acid determinations are shown in Table 5.

TABLE 4

Approximate Product Yields and
Head Analysis for Sterilized
Fresh Fruit. (Percent)

| | Yields | Head |
|---|---|---|
| Nuts | 35.0 | 29.0 |
| Fiber and fine solids | 5.0 | 11.0 |
| Solids in Sludge (estimated) | 1.0 | |
| Oil — recovered | | |
| Stage 1 | 20.0 | 45.5 total oil |
| Stage 2 | 2.0 | |
| Stage 3 | 3.0 | |
| Residual solids (Oil) | 0.1 oil | |
| Balance (by difference) | 33.9 sludge | 14.5 water |
| | water | |
| | 100.0 | 100.0 |

TABLE 5

Free fatty acid content of oil from
sterilized fresh palm fruit

| Sample | Percent Palmitic Acid |
|---|---|
| Head | 1.02 |
| Stage 1 | 0.63 |
| " 2 | 0.75 |
| " 3 | 0.05 |

The nitrogen value of the fine solids was 2.18 percent by Kjeldahl analysis.
The oil in the residual solids was:
+ 22 mesh : 1.0%
− 22 mesh : 1.5%

D. Discussion of Results.

D.1. Fresh Fruit. The high value obtained from fruit sterilized prior to analyzing for FFA indicated that the fresh fruit sample was in a severe state of deterioration when received.

Disintegration of the stalk was difficult in the system of fluid mixing described above. While this may have been partly due to the small scale of operation, it is certain that to be effective in practice, reasonable chipping with cutting knives or alternative size reduction may be essential to ensure suspension in the slurry.

The fruit disintegrated reasonably easily but it was necessary to use two stages of fairly intense mixing to adequately strip the pericarp from the nut. The dry solid residues and nuts were separated readily by screening.

D.2. Sterilized Fruit.

D2.1. Digestion-Extraction. In the case of sterilized fruit, disintegration was easy and one stage of mixing was sufficient to adequately strip the pericarp from the nut. At the same time lower agitation intensity was used indicating low power requirements for this operation. Separation of the nuts from the stage 1 slurry was simple by wet screening.

Immediate separation and separate processing of nuts and fiber solids in the subsequent stages is desirable. It may be desirable to separate coarse fiber from the fine solid at this stage because the majority of residual oil in the solids appeared to be in the fine solids. The practical advantage with this technique is the ready removal of residual oil from nut and fiber by a simple washing system on a screen deck while the fine solids require longer reaction time and positive separation from the solvent.

D2.2 Oil Recovery. The first stage liquor required separation from fibrous solids to enable a ready separation of the oil. In commercial operation separation would be carried out using a solid bowl centrifuge similar to the Westfalia decanter or a vibrating screen as used at present to remove fiber from the oil. The solids would be returned into the second stage of extraction. More efficient separation of the hot liquor could be achieved using an automatic desludging centrifuge, the solids again being returned to stage 2, the oil passing to a solvent stripping column and the aqueous solvent passing to solvent recovery.

The second stage oil seemed to separate satisfactorily and rapidly under gravity and use of a settling tank is possible. Addition of the optimum water requirement for stage 1 to the liquor prior to entering stage 1 would ensure a maximum yield of stage 2 oil.

If oil is required from stage 3 it is desirable to cool the outgoing liquor from this stage to precipitate oil readily and remove it by settling.

Variation in the percentage recovery between the three stages may be obtained by variation of the process conditions. As shown in Table 4 the yield of oil from both stages 2 and 3 was lower than that shown in table 2. This may have been caused by the boiling water rinse adopted to displace oil from the "bed" of fiber in the centrifuge. Similarly a re-cycle liquor rinse may be used to reduce or control the quantity of oil carried forward with the solids.

The only loss from the process is that retained in the solid residue leaving the final extraction stage.

It may be expedient to recover all the oil in one stage only because separate recoveries require separate stripping units and there may be little advantage to be gained by separate recovery. The most notable improvement however was in the third stage oil, but the overall percentage yield in this stage was low.

All samples of oil bleached readily.

E. Olives. The following example illustrates the application of the invention to olives:

E.1. Material. Fresh olives were processed for the recovery of olive oil.

E.2. Equipment. The equipment used was similar to that described for palm fruit.

E.3. Procedure. 1 kg. of fruit was mixed for 5 minutes under mixing conditions imposing moderate fluid shear on the system. The solvent mass was determined by the solvent/water mass ratio of 2/1 and the water content of the fruit, thus 1240 g. solvent was added for the water content of 62%.

The temperature of the reaction was above 25°C.

The liquor was separated from the solids and the solids further processed in a counter-current system at 45° – 50°C. to recover the oil retained in these solids. A total of four stages of extraction were used.

Oil was recovered by two techniques.
1. by separation from the solvent by settling, decanting and stripping of solvent from the oil by steam;
2. by separation from the aqueous liquor remaining after solvent recovery.

The solids were dried and recovered.

E.4. Results.
E4.1. Process Yields compared with Head.

| Oil | Process | Head. |  |
|---|---|---|---|
| Oil | 13.6% | 11.9% | |
| Pips | 12.0 | | |
| | 23.0 | 26.1 | (pips & |
| Solids | 11.0 | | solids) |
| Oil-sludge | 0.7 | | |
| Water (by difference) | 62.7 | 62.0 | (direct evaluation) |

E4.2. Oil.
i. Recovered by separation and stripping of solvent.

The oil was very pale yellow and similar to first quality virgin oil in appearance, taste and bouquet.

It contained free fatty acids equal to 0.11 percent expressed as oleic acid and possessed a refractive index at 15°C of 1.4701.

ii. Recovered after distillation of solvent.

This oil was darker than the oil which was separated from the aqueous solvent. It was similar to commercial olive oil in appearance and taste and it retained a distinct fruity bouquet.

It gave the following analysis:

| | |
|---|---|
| Free fatty acid (as oleic acid) | 0.48% |
| Refractive index at 15°C | 1.4701 |
| S.G. 15.5/15.5 | 0.918 |
| Weight per ml at 20°C. | 0.914 |
| Iodine Value (Hanus) | 83 |
| Saponification Value. | 193. |

I claim:

1. A process for extracting oil from palm fruit or olives consisting in passing the fruit into a multi-stage counter-current flow with an organic solvent selected from the group comprising acetone, a mixture of ethyl alcohol, ethyl acetate and acetone in the ratio of 1:1:1 by volume and a mixture of ethyl alcohol, ethyl acetate and isopropyl ether in the ratio of 4:2:1 by volume, separating the liquor from the solid material in each stage before passing the solid material from one stage to another, passing the separated liquor from each stage to a preceding stage, maintaining the temperature of each stage between 50°C and 55°C, adjusting the water-to-solvent ratio in the first stage between 1:1 and 1:2 by weight, agitating the slurry of solvent and solid material in each stage, disintegrating the pericarp of the fruit without substantial breaking of the nuts inside the fruit during the agitation in the first stage and separating the oil from the separated liquor in the first stage.

2. The process as defined in claim 1 which comprises using the separated extraction liquor flowing from each stage to a preceding stage to wash the solid material passing from a preceding stage.

3. The process as defined in claim 1 which comprises centrifuging the outgoing extraction liquor from said first stage to separate the oil therefrom, and stripping said separated oil of solvent.

4. The process as defined in claim 1 which comprises screening the slurry of extraction liquor and solid material from said first stage to separate the nuts and coarse fibrous solid material, and separating the fine solid material passing through the screen from the extraction liquor by centrifuging before it is passed to the next stage.

5. The process as defined in claim 1, which comprises cooling the liquor passing out of at least one stage, and removing the free oil which separates therefrom before said liquor is passed to the preceding stage.

* * * * *